United States Patent
Ervin et al.

[11] Patent Number: 5,862,358
[45] Date of Patent: *Jan. 19, 1999

[54] METHOD AND APPARATUS FOR REDUCING THE APPARENT READ LATENCY WHEN CONNECTING BUSSES WITH FIXED READ REPLY TIMEOUTS TO CPUS WITH WRITE-BACK CACHES

[75] Inventors: Joseph Ervin, Stow; Jonathan Crowell, Boston, both of Mass.

[73] Assignee: Digital Equipment Corporation, Maynard, Mass.

[*] Notice: This patent issued on a continued prosecution application filed under 37 CFR 1.53(d), and is subject to the twenty year patent term provisions of 35 U.S.C. 154(a)(2).

[21] Appl. No.: 856,032

[22] Filed: May 14, 1997

Related U.S. Application Data

[63] Continuation of Ser. No. 359,501, Dec. 20, 1994, abandoned.

[51] Int. Cl.⁶ ..................................... G06F 13/14
[52] U.S. Cl. .................. 395/309; 395/306; 395/308; 711/143
[58] Field of Search .................... 395/306–309, 395/281; 711/113, 118, 143, 146

[56] References Cited

U.S. PATENT DOCUMENTS

| | | | |
|---|---|---|---|
| 5,003,463 | 3/1991 | Coyle et al. | 395/877 |
| 5,119,485 | 6/1992 | Ledbetter, Jr. et al. | 395/473 |
| 5,185,875 | 2/1993 | Chinnaswamy et al. | 395/448 |
| 5,353,415 | 10/1994 | Wolford et al. | 395/306 |
| 5,428,761 | 6/1995 | Herlihy et al. | 395/457 |
| 5,485,592 | 1/1996 | Lau | 395/470 |
| 5,506,968 | 4/1996 | Dukes | 395/728 |
| 5,506,971 | 4/1996 | Gullette et al. | 395/296 |

Primary Examiner—Meng-Al T. An
Assistant Examiner—Sumati Lefkowitz
Attorney, Agent, or Firm—Anne E. Saturnelli

[57] ABSTRACT

An apparatus is provided for reducing read latency for an I/O device residing on a first bus having a first, short read latency timeout period. The apparatus includes a I/O bridge on a second bus having a second, longer read latency timeout compared to that of first bus which modifies read transactions into two separate transactions. A first transaction is a write transaction to the same address requested by the read transaction. This transaction forces a write-back if the address hits in a CPU's write-back cache. Thereafter the read transaction is performed after a predetermined period of time following initiation of the write transaction. This removes the possibility of a device on the first bus having a short read latency timeout period from exceeding it's read latency timeout limit.

14 Claims, 3 Drawing Sheets

E-BUS BRIDGE

METHOD AND APPARATUS FOR REDUCING THE APPARENT READ LATENCY WHEN CONNECTING BUSSES WITH FIXED READ REPLY TIMEOUTS TO CPUS WITH WRITE-BACK CACHES

This application is a continuation application Ser. No. 08/359,501, filed Dec. 20, 1994, now abandoned.

BACKGROUND OF THE INVENTION

This invention relates generally to computer systems and more particularly to computer systems having write-back caches.

As it is known in the art, certain I/O busses such as Digital Equipment Corporation's Q-bus™ have a short read latency timeout. A read latency timeout is defined as the longest period of time required by the system for satisfying a read request from an I/O device. For the Q-bus this read latency timeout is eight microseconds. Once an I/O device residing on the Q-bus does a read request transaction the requesting device waits for eight microseconds and if the requesting device hasn't received the data within this time period the requesting device assumes that there was a fault and declares a fatal error.

In some applications it is desirable to connect I/O busses having a short read latency timeout to a computer system including a Central Processor Unit (CPU) and a cache memory and in particular a write-back cache memory. Typical cache memory is relatively small, high-speed memory compared to main memory and is physically located close to ie processor. In systems using cache memory with a CPU, the cache memory is typically provided to hold data which is most likely to be used by the processor.

A CPU will retrieve data from main memory, perform some operation on the data and eventually write this data back to main memory. The performance of a system is effected by the number of times a CPU performs read and write type operations to main memory. In order to reduce the number of operations the CPU performs with main memory many CPUs incorporate various cache memory techniques.

One technique used is the incorporation of a write-back cache. A write-back cache improves the performance of a system by limiting the number of write transactions to main memory. If a CPU seeks to perform a write operation to main memory, and the location is located in this CPU's cache (a cache hit), then the cache location is written to and it now contains the latest version of the data for that memory location. This saves the CPU from performing a write operation to main memory and results in an increase in performance. If the CPU requests a write to a memory location that is not in the cache (a cache miss) then the write to main memory is performed, or optionally the location can be allocated into the cache and then the write can be done into the cache.

One drawback to write-back caches occurs when the CPU is required to perform a write-back operation. Should a read from either a second CPU or from an I/O device hit in the first CPU's cache then the first CPU will stall the read transaction requested by the second CPU or I/O device, write the current version of the data out from the first CPU's write-back cache to main memory where it can be accessed by the requesting CPU or I/O device, and then allow the original requested transaction to complete. In this manner the original read transaction takes a longer time to complete since it waits for the write-back operation to occur before it can access the desired data.

Proper system operation requires that the system be able to satisfy read requests from I/O devices in a period of time less than or equal to the worst case read latency timeout limit for the bus the I/O device resides on. Accordingly in some cases it is possible for a read latency timeout to occur while performing a write back operation caused by a different read operation. For example, if a read is requested from an I/O device residing on an I/o bus having a short read latency timeout, this read can stall due to a currently executing read transaction from a device on a different I/O bus. This currently executing read stalls because the location requested by the read hits in the CPU's write-back cache. In response, the CPU will perform a write-back operation. The stalled read from the device on the different I/O bus is allowed to finish, and the read requested by the I/O device residing on the I/O bus having a short read latency timeout is then able to start. However, the device requesting this read may have timed out before this read can complete, due to the long wait caused by the previous read which resulted in a write-back operation. Should this timeout take place a fatal error is declared, and system operation halts.

SUMMARY OF THE INVENTION

In accordance with the present invention a method of operating a computer system including at least two I/O busses, a first one of the I/O busses having a short timeout period, the second one of the I/O busses having a longer timeout period than the first bus, including the steps of receiving a read transaction from an I/O device coupled to the second bus and performing a write transaction to the memory address specified in the read transaction is presented. The method further includes the steps of waiting a period of time before starting the read transaction on the second bus while permitting a transaction on the first bus to occur and, after the period of time has expired, performing the read transaction on the second bus to the memory address. With such an arrangement the computer system can be operated such that the first I/O bus having the short latency timeout period does not exceed it's latency timeout limit.

In accordance with a further aspect of this present invention an I/O bridge including a timer, cycle decode logic having inputs coupled to means for interfacing to a first I/O bus, control logic having inputs coupled to outputs of said cycle decode logic, outputs of said control logic coupled to means for interfacing to a second I/O bus, with the timer coupled to the control logic, data path logic having a first set of input/output connections coupled to the means for interfacing to a first I/O bus, the data path logic having a second set of input/output connections coupled to the means for interfacing to a second I/O bus, cycle decode logic includes means responsive to a read transaction provided from the means for interfacing to a first I/O bus, means for initiating a write transaction to the means for interfacing to the second I/O bus, the control logic further includes means responsive to the write transaction from the cycle decode logic for starting the timer and for sending the read transaction after the timer has expired, means for interfacing the I/O bridge to a first bus having a longer read latency timeout period, means for interfacing said I/O bridge to a second I/O bus. With such an arrangement the computer system can be operated such that the first I/O bus having the short latency timeout period does not exceed it's latency timeout limit.

DESCRIPTION OF PREFERRED EMBODIMENTS

Figure 1:
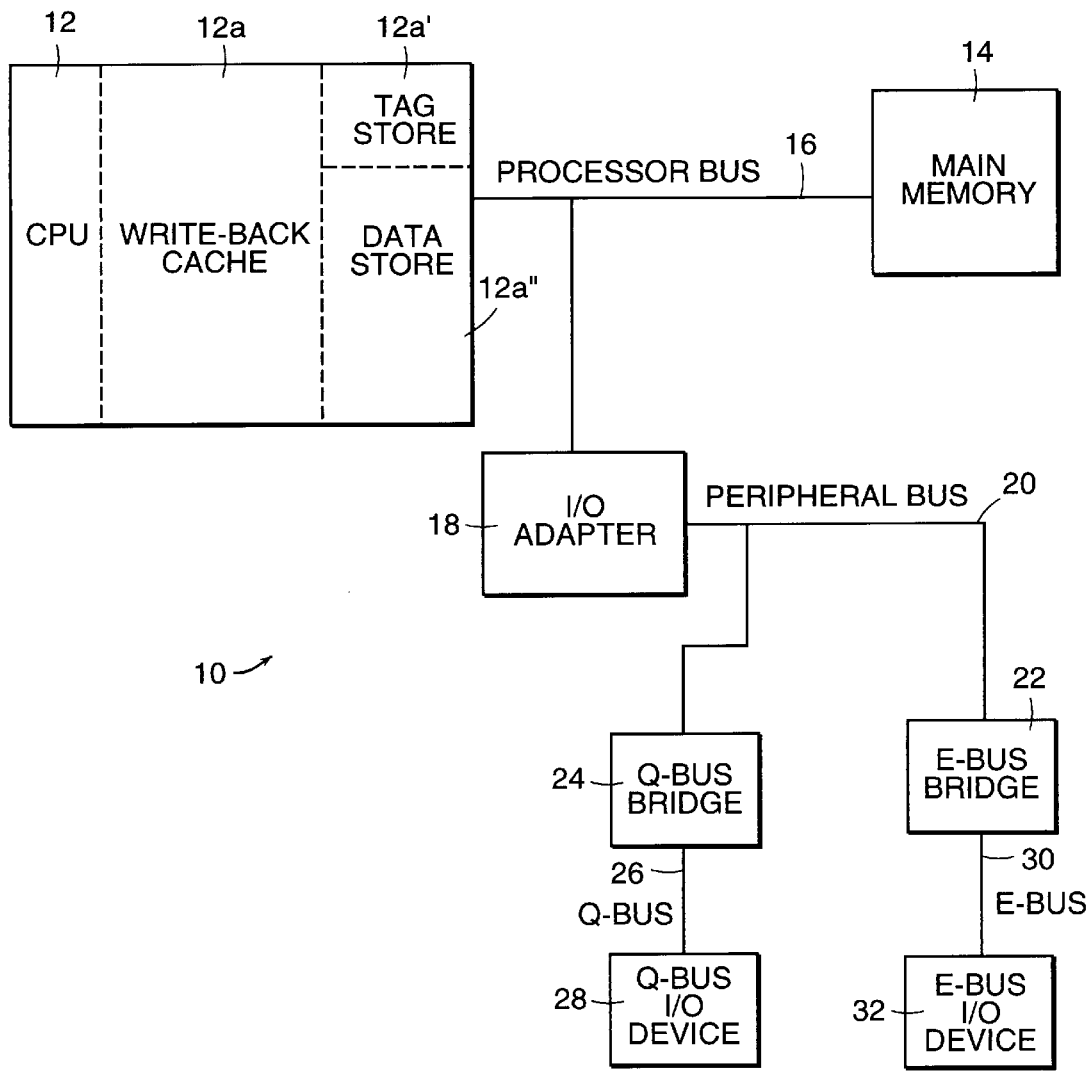
FIG. 1 is a block diagram showing a computer system where an I/O device residing on a bus having a short read latency timeout is connected along with an I/O device residing on a bus having a longer read latency timeout.

Referring now to FIG. 1 a computer system 10 is shown to include a processor bus 16 which electrically connects a CPU 12 having a write-back cache 12a with an I/O adapter 18 and a main memory 14. The write back cache includes a tag store 12a' and data store 12a". The tag store is used to store portions of memory addresses to identify the data stored in the data store 12a". The processor bus 16 is used to transfer data, addresses, commands and control signals between the devices connected to it. The computer system 10 also includes a peripheral bus 20 with peripheral bus 20 supporting so called "dump-and-run" writes, that is write operations where the control of the peripheral bus is released without waiting for the entire transaction to propagate to main memory. The peripheral bus 20 is further shown to connect a first I/O bridge, here a Q-bus™ bridge 24, and a second I/O bridge, here an expansion bus (E-bus) I/O bridge 22 to the I/O adapter 18. The peripheral bus 20 allows for the exchange of data, commands, addresses and control signals between the I/O bridges 22 and 24 and I/O adapter 18. The Q-bus™ bridge 24 is used to interconnect an I/O bus 26, in this instance Digital Equipment Corporation's Q-bus™, having a short read latency timeout period of eight microseconds, to the peripheral bus 20. The Q-bus 26 connects at least one Q-bus I/O device 28 to the system via the Q-bus bridge 24. The Q-bus 26 is used to transfer data, addresses, commands and control signals between the Q-bus I/O device 28 and the Q-bus bridge 24. The E-bus bridge 22 is used to interconnect a second I/O bus 30 called the Expansion bus (E-bus) to the peripheral bus 20. The E-bus 30 has a long read latency timeout period of ten milliseconds. The E-bus 30 connects to at least one E-bus I/O device 32 and is used to transfer data, commands, addresses and control signals between E-bus I/O devices and the E-bus bridge 22. Thus, the I/O bridges 22 and 24 allow for the transfer of data, commands, addresses and control signals to and from the I/O bridges respective I/O devices 28 and 32, through the I/O adapter 18 and to the CPU 12 and main memory 14.

Because the Q-bus Bridge 24 and E-bus Bridge 22 reside on the same Peripheral Bus 20, each device arbitrates for the use of the Peripheral Bus 20. Generally, if a Q-bus I/O device 28 issues a memory read transaction on the Q-bus 26 while the E-bus bridge 22 is using the Peripheral Bus 20 (for example while servicing a transaction from an E-bus I/O device 32), the Q-bus read will be stalled until the Q-bus bridge 24 can access the Peripheral Bus 20 to perform the read to Main Memory 14. However, the Q-bus device 28 will only wait 8 microseconds for the read data, thereafter it will assume that the memory location is nonexistent, abort the read and log a system failure. In order to prevent a system failure from occurring it is necessary to reduce the maximum length of time that the E-bus Bridge 22 will use the Peripheral Bus 20 during a single transaction. This likewise reduces the maximum amount of time that the Q-bus Bridge 24 will have to wait before it can use the Peripheral Bus 20 to service a read transaction from the Q-bus Device 28.

The latency experienced by the Q-bus device 28 is reduced by the E-bus Bridge's 22 ability to reduce the amount of time it uses on the Peripheral Bus 20 when performing Memory Read operations in response to a read request from E-bus I/O device 32. This is accomplished by forcing a write-back of the target memory location prior to issuing the read if the location is located in the CPU's write-back cache memory 12a. This is accomplished by taking advantage of two characteristics of system behavior; the first is that a memory write by an I/O Bridge to a location that exists in a modified state in a CPU's write-back cache 12a will cause the cache line to be written back to main memory 14, and the second is that a masked write with all byte masks disabled will invoke this write-back mechanism without modifying the target memory location.

Figure 2:
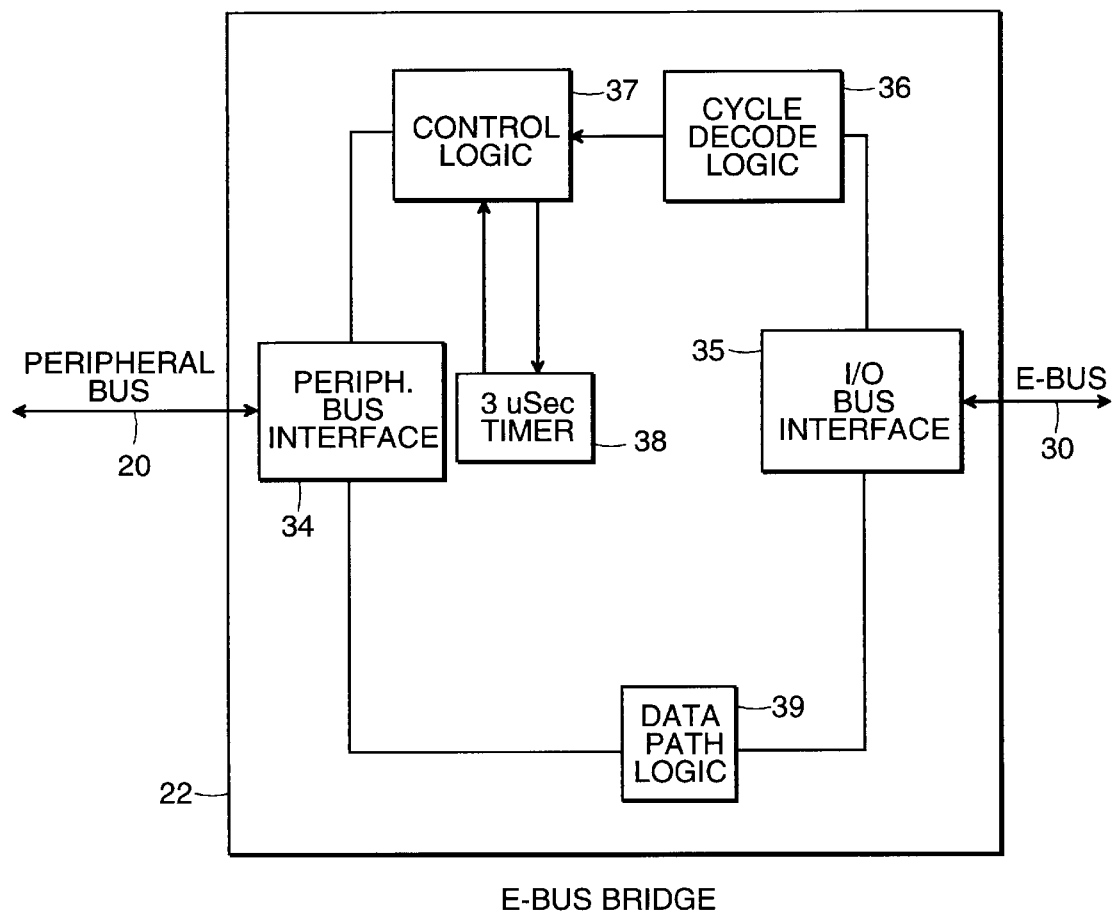
FIG. 2 is a block diagram of the E-bus bridge.
Figure 3:
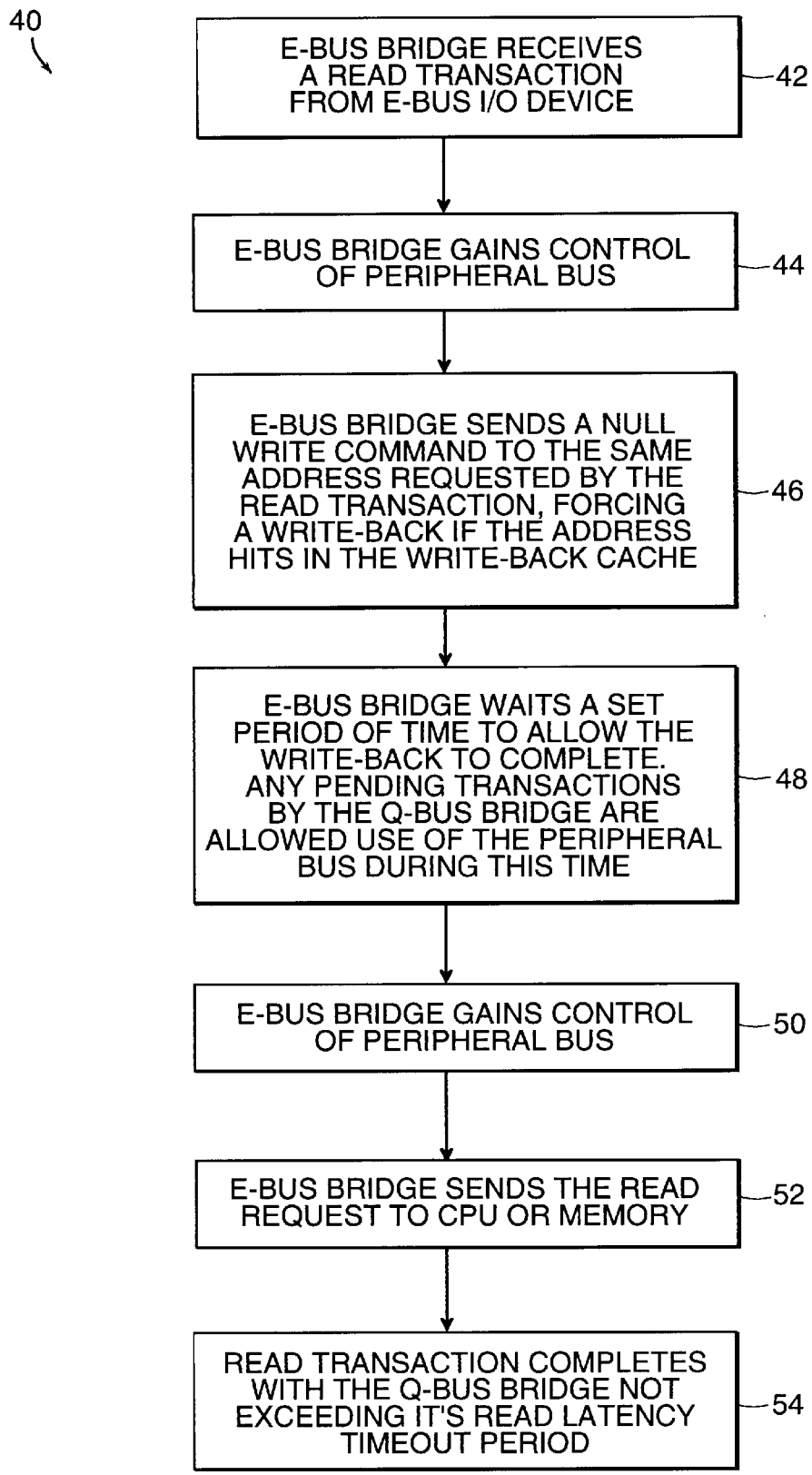
FIG. 3 is a flow chart showing the operations involved for reducing the read latency timeout.

Referring now to FIG. 2, the E-bus bridge 22 is shown to include control logic 37 which is coupled to control lines of peripheral bus interface 34 which is in turn coupled to the Peripheral Bus 20 and is used to regulate the data transfers through the E-bus Bridge 22. The control logic is coupled to a timer 38 which provides a selected time period to the control logic 37 for waiting for a write back transaction to complete on the Processor Bus 16 (FIG. 1). Data Path logic 39 is also shown coupled between peripheral bus interface 34 coupled to Peripheral Bus 20 and I/O bus interface 35 coupled to E-bus 30 and is used to control data transfers there between. The E-bus bridge 22 further includes cycle decode logic 36 which is used to determine the type of command presented to the E-bus bus bridge 22. Referring now also to FIG. 3, operation of the E-bus Bridge to reduce the amount of time it uses the Peripheral Bus while servicing read transactions from the E-bus device can be described as follows: When the E-bus I/O device 32 (FIG. 1) issues a memory read transaction, the E-bus Bridge 22 receives the transaction on E-bus inputs 30 (FIG. 2), at step 42 (FIG. 3). The I/O bus interface 35 then passes the command to the cycle decode logic 36 which then determines that a read transaction has been requested by the E-bus I/O device. The cycle decode logic 36 in response to the read transaction will first pass a write command to control logic 37 on the E-bus bridge 22 to initiate the write transaction on the peripheral bus 20. The control logic 37 accomplishes this by arbitrating for control of the peripheral bus 20, and once the control logic has acquired the peripheral bus at step 44 the control logic 37 issues a masked write transaction through peripheral bus interface 34 to the same address as that which the E-bus I/O device is requesting in it's read transaction at step 46. The byte masks associated with this masked write transaction are all disabled, such that the write has no real effect on the contents of the memory location. Thus the masked write operation and arbitrary data are written out through peripheral bus interface 34 to the peripheral bus 20 from the E-bus 30 via I/O bus interface 35 and data path logic 39. The control logic then relinquishes control of the Peripheral Bus, and waits for a predetermined period of time by initiating the timer 38 which here waits for a three microsecond period. Here timer 38 is a hardware timer but could alternatively be a software timer. The E-bus bridge 22 waits at step 48 for the predetermined period of time. The period of time is chosen to be sufficient for the masked write transaction to complete all the way into the Main Memory, including any write-backs that may be done by the CPU. During this period of time at step 50 the Peripheral bus 20 is available for use by the Q-bus bridge. Once the period of time has elapsed the E-bus bridge 22 then reacquires control of the Peripheral Bus 20 via control logic 37 and peripheral bus interface 34 and issues a read transaction to the address specified by the E-bus device at steps 52 and 54. Because of the masked write transaction that was previously issued to this address, the address associated with this read will not hit in the CPU's write-back cache 12a, and hence will not need to be written back from the CPU's write-back cache 12a.

Because the E-bus Bridge 22 relinquishes the Peripheral Bus 20 between the masked write transaction and the read transaction, the Q-bus Bridge 24 is allowed to gain control of the Peripheral Bus 20 to service transactions from the Q-bus Device 28. Furthermore, through the use of the masked write transaction by the E-bus Bridge 32 to the memory address, the transaction effectively removes those tag stores accorded the memory address from the tag store 12a' as well as removing tag data from the data store 12a" of the CPU's write-back cache 12a. The write command is issued to the particular memory address to cause the write back to be performed, that is it flushes the CPU's write back cache 12a. Therefore, the E-bus Bridge's 22 use of the Peripheral Bus 20 is in two short periods, rather than one long period. By breaking the transaction into two distinct and separate periods, the Q-bus bridge 24 can use the Peripheral Bus 20 in between the two periods. Accordingly the maximum amount of time that the Q-bus Bridge 24 will ever have to wait for use of the Peripheral Bus 20 is significantly reduced, and the read latency timeout period is not exceeded.

Having described preferred embodiments of the invention it will now become apparent to those of ordinary skill in the art that other embodiments incorporating these concepts may be used. Accordingly it is submitted that the invention should not be limited to the described embodiments but rather should be limited only by the spirit and scope of the appended claims.

We claim:

1. A method of operating a computer system including at least two I/O busses, a first of said I/O busses having a first timeout period, a second of said I/O busses having a second timeout period which is longer than said first timeout period, the method comprising the steps of:

receiving a read transaction from an I/O device coupled to said second I/O bus;

performing, in response to said read transaction, a null write transaction to a memory address specified in said read transaction such that if there is a more recent copy of data corresponding to said memory address stored in a location other than a main memory, the null write transaction causes the most recent copy to be written to the main memory;

waiting a predetermined period of time before starting said read transaction on said second I/O bus while permitting a transaction on said first I/O bus to occur; and after said predetermined period of time, performing said read transaction on said second I/O bus to said memory address.

2. The method of operating a computer system as recited in claim 1, wherein said null write transaction is a masked write operation which is performed with all mask bits disabled to prevent contents of a memory location corresponding to the memory address from being changed.

3. The method of operating a computer system as recited in claim 1, wherein, if said null write transaction hits in a write-back cache of a CPU, then a write-back operation is performed during the waiting period.

4. The method of operating a computer system as recited in claim 3, wherein said write-back operation and said waiting step result in said first I/O bus not exceeding said first timeout period.

5. An I/O bridge comprising:

a timer;

means for interfacing said I/O bridge to a first bus having a first read latency timeout period;

control logic coupled to said timer, said control logic used to control data transfers through said I/O bridge; and cycle decode logic having inputs coupled to said means for interfacing and including:

means, responsive to a read transaction from said interfacing means, for initiating a write transaction to said interfacing means; and wherein said control logic further includes:

means responsive to a write transaction from said cycle decode logic for starting said timer and for sending said read transaction after said timer has expired.

6. The I/O bridge of claim 5, wherein said cycle decode logic receives a read transaction from said first I/O bus logic, and issues a masked write operation to said control logic, and a masked write transaction to a memory address specified in said read transaction on a second I/O bus, and wherein said control logic waits for said timer to expire before issuing said read transaction on said second I/O bus.

7. The I/O bridge of claim 6, wherein said write transaction includes a write operation which is performed with all mask bits disabled.

8. A computer system comprising:

a processor bus;

at least one CPU module coupled to said processor bus;

a peripheral bus;

an I/O adapter coupled between said processor bus and said peripheral bus;

a first I/O bus bridge coupling a first I/O bus having a first read latency timeout period to said peripheral bus;

a second I/O bus bridge for coupling a second I/O bus having a second read latency timeout period which is longer than said first read latency timeout period, said second I/O bus bridge coupling said second I/O bus and said peripheral bus, said second I/O bus bridge comprising:

a timer;

means for interfacing said second I/O bus bridge to said second I/O bus;

control logic coupled to said timer, said control logic for regulating data transfers through said second I/O bus bridge; and cycle decode logic having inputs coupled to said means for interfacing and including:

means, responsive to a read transaction provided from said means for interfacing to a first I/O bus, for initiating a write transaction to said means for interfacing to said second I/O bus; and said control logic further including:

means, responsive to the write transaction from said cycle decode logic, for starting said timer and for sending said read transaction after said timer has expired.

9. The computer system as recited in claim 8, wherein said peripheral bus supports write operations in which control of said peripheral bus is released without waiting for an entire transaction to propagate to main memory included in said computer system.

10. The computer system as recited in claim 9, wherein said at least one CPU includes a write-back cache.

11. The computer system as recited in claim 10, wherein, upon said second I/O bus bridge receives a read command from said second I/O device, said second I/O bridge performs a masked write operation to an address specified by said read command, said second I/O bus bridge waits a time period before performing said read command included in a read transaction.

12. The computer system as recited in claim 11, wherein said masked write operation is a hit in a write-back cache of said at least one CPU.

13. The computer system as recited in claim 12, wherein said hit in said write-back cache results in said CPU performing a write-back operation to a memory module.

14. The computer system as recited in claim 13, wherein said second I/O bus bridge, responsive to a read transaction, performs said masked write operation, waits said period of time, and performs said read transaction resulting in said first I/O bus bridge not exceeding said first latency timeout period.

* * * * *